(12) United States Patent
Fu et al.

(10) Patent No.: US 11,953,398 B2
(45) Date of Patent: Apr. 9, 2024

(54) QUASI-STATIC CALCULATION METHOD FOR LATERAL UNBALANCED FORCE OF TRANSMISSION LINES

(71) Applicant: DALIAN UNIVERSITY OF TECHNOLOGY, Liaoning (CN)

(72) Inventors: Xing Fu, Liaoning (CN); Wenlong Du, Liaoning (CN); Hongnan Li, Liaoning (CN); Gang Li, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 51 days.

(21) Appl. No.: 17/917,354

(22) PCT Filed: Mar. 10, 2022

(86) PCT No.: PCT/CN2022/080088
§ 371 (c)(1),
(2) Date: Oct. 6, 2022

(87) PCT Pub. No.: WO2023/168647
PCT Pub. Date: Sep. 14, 2023

(65) Prior Publication Data
US 2023/0288276 A1    Sep. 14, 2023

(51) Int. Cl.
*G01L 5/04* (2006.01)
*G06F 17/11* (2006.01)
(52) U.S. Cl.
CPC .............. *G01L 5/04* (2013.01); *G06F 17/11* (2013.01)

(58) Field of Classification Search
CPC .................................. G01L 5/04; G06F 17/11
See application file for complete search history.

(56) References Cited

U.S. PATENT DOCUMENTS

| 5,517,864 | A  | * | 5/1996 | Seppa ...................... | G01L 5/103 |
| | | | | | 73/862.391 |
| 10,205,307 | B2 | * | 2/2019 | Lancaster ................ | H02G 1/02 |
| 10,317,570 | B2 | * | 6/2019 | Lilien ...................... | G06F 17/00 |
| 10,386,542 | B2 | * | 8/2019 | Bai ........................... | G01W 1/10 |
| 11,237,078 | B2 | * | 2/2022 | Manenti .................... | H02G 1/02 |
| 11,652,343 | B1 | * | 5/2023 | Wang ....................... | H02G 7/04 |
| | | | | | 174/40 R |

(Continued)

*Primary Examiner* — Freddie Kirkland, III
(74) *Attorney, Agent, or Firm* — Muncy, Geissler, Olds & Lowe, P.C.

(57) ABSTRACT

The present invention belongs to the technical field of disaster prevention and reduction of transmission lines, and provides a quasi-static calculation method for lateral unbalanced force of transmission lines. The present invention can quantify significant unbalanced force caused by a failed tower to an adjacent tower, thus to quantitatively evaluate cascading failure risk of transmission lines. The present invention does not need a lot of iteration, and can parametrically reveal influence of various factors on unbalanced force. The present invention quantifies influence of large deformation effect of a conducting wire on wind load, and at the same time, wind load of the conducting wire is corrected by the trapezoidal equivalent wind pressure proposed, which avoids wind load calculation error of the conducting wire caused by a relatively large vertical height difference, better reflects actual mechanical state of the lines, and optimizes existing wind load calculation method of transmission lines.

2 Claims, 2 Drawing Sheets

(56) References Cited

U.S. PATENT DOCUMENTS

| | | | |
|---|---|---|---|
| 2007/0200556 A1* | 8/2007 | Engelhardt | G01K 1/143 324/106 |
| 2020/0387651 A1* | 12/2020 | Schulze | G06F 30/12 |
| 2022/0237335 A1* | 7/2022 | Waki | G06F 30/17 |

* cited by examiner

QUASI-STATIC CALCULATION METHOD FOR LATERAL UNBALANCED FORCE OF TRANSMISSION LINES

TECHNICAL FIELD

The present invention belongs to the technical field of disaster prevention and reduction of transmission lines, and particularly relates to a quasi-static calculation method for lateral unbalanced force of transmission lines.

BACKGROUND

Transmission lines are important lifeline engineering. Under the action of various disasters, damage of local transmission lines can evolve into a large-scale power interruption accident and lead to city shutdown, which will seriously affect economic development and social operation. As wind load has significant randomness in space and time, a tower in local transmission lines will be damaged first under the action of instantaneous strong gust wind, both ends of a conducting wire will have relative displacement under the drive of the damaged tower, and significant additional tension will be generated on the conducting wire, which is easy to cause cascading failure of the lines under the combined action of the wind load. At present, a nonlinear finite element method is a typical method for evaluating tension of conducting wires. Although having certain advantages in analysis accuracy, the method needs complicated pre-process and post-process, which is very inconvenient for engineering application. In view of the above problems, the present invention provides a quasi-static calculation method for lateral unbalanced force of transmission lines, which can quickly quantify influence of a failed tower on an adjacent tower. The present invention greatly improves evaluation efficiency of cascading failure risk of transmission lines, provides an efficient analysis tool for engineers, and has a good application prospect in transmission line design industry.

SUMMARY

The purpose of the present invention is to propose a quasi-static calculation method for lateral unbalanced force of transmission lines, which is used to quickly evaluate influence of a failed tower on an adjacent tower.

The technical solution of the present invention is as follows:

A quasi-static calculation method for lateral unbalanced force of transmission lines, comprising the following steps:

Step 1: Determining Mean Wind-Induced Lateral Unbalanced Force

For a span conducting wire with an initial vertical height difference $c_0$ at both ends, displacement components of one end in longitudinal direction (direction along the conducting wire in a horizontal plane, i.e. x-axis direction), vertical direction (direction of gravity, i.e. y-axis direction) and lateral direction (direction perpendicular to the conducting wire in a horizontal plane, i.e. z-axis direction) are respectively $\Delta X$, $\Delta Y$ and $\Delta Z$, and a standard cubic equation with $H_1$ as a variable can be obtained:

$$H_1^3 + \left(\frac{EAq^2L^2}{24H_0^2} - \frac{EA(\Delta Y^2 + \Delta Z^2 + 2L\Delta X + 2c_0\Delta Y)}{2L^2} - H_0\right)H_1^2 + \qquad (1)$$

$$\left(-\frac{EA\Delta Z\lambda}{L^3}\right)H_1 + EA\left(-\frac{q^2L^2}{24} - \frac{\delta}{2L^3}\right) = 0$$

$$\delta = \int_0^L \left(\left(\int_0^L \int_0^{x_2} (\bar{f}_{Ref}(x_1)dx_1)dx_2\right)^2 + L^2\left(\int_0^x \bar{f}_{Ref}(x_1)dx_1\right)^2 - \qquad (2)$$

$$2L\int_0^L \int_0^{x_2} (\bar{f}_{Ref}(x_1)dx_1)dx_2 \cdot \int_0^x \bar{f}_{Ref}(x_1)dx_1\right)dx$$

$$\lambda = \int_0^L \left(\int_0^L \int_0^{x_2} (\bar{f}_{Ref}(x_1)dx_1)dx_2 - L\int_0^x \bar{f}_{Ref}(x_1)dx_1\right)dx \qquad (3)$$

Meanings of parameters in the formulas: $H_0$ represents initial horizontal tension; EA represents Young's modulus; q represents weight per unit length of the span conducting wire; L represents horizontal span; both $\delta$ and $\lambda$ represent constants related to mean wind pressure; $\bar{f}_{Ref}(x)$ is a theoretical wind pressure function; and $H_1$ represents horizontal tension of the span conducting wire under combined action of support displacement and mean wind, which can be obtained by solving formula (1) via Cardan's formula.

Further, the mean wind-induced lateral unbalanced force at both ends of the span conducting wire is obtained:

$$\bar{T}_{z0} = \frac{1}{L}\int_0^L \int_0^{x_2} (\bar{f}_{Ref}(x_1)dx_1)dx_2 + \frac{H_1\Delta Z}{L} \qquad (4)$$

$$\bar{T}_{z1} = \frac{1}{L}\int_0^L \int_0^{x_2} (\bar{f}_{Ref}(x_1)dx_1)dx_2 - \int_0^x \bar{f}_{Ref}(x_1)dx_1 + \frac{H_1\Delta Z}{L} \qquad (5)$$

Where: subscripts 0 and 1 respectively represent one side of the span conducting wire without support displacement and one side of the span conducting wire with support displacement, the same below.

Step 2: Determining Fluctuating Wind-Induced Lateral Unbalanced Force

Considering quasi-static background response only, the fluctuating wind-induced lateral unbalanced force at both ends of the span conducting wire is calculated by an influence line method:

$$T_{z0} = \frac{L}{n}\sum_{i=1}^{n}\left(1 - \frac{x_i}{L} + \frac{\Delta Z}{L}\varphi_h\right)F_{Ref}(x_i, t) \qquad (6)$$

$$T_{z1}(t) = \frac{L}{n}\sum_{i=1}^{n}\left(\frac{x_i}{L} - \frac{\Delta Z}{L}\varphi_h\right)F_{Ref}(x_i, t) \qquad (7)$$

Meanings of parameters in the formulas: $F_{Ref}(x_i,t)$ represents fluctuating wind load acting on each point of the span conducting wire; n represents number of wind speed simulation points; $x_i$ represents x-coordinate of the fluctuating wind load; $\varphi_h$ represents increment of horizontal tension caused by unit wind load, and the expression thereof is:

$$\varphi_h = \frac{\dfrac{1 - x_1/L}{H_1}\int_0^{x_1}\dfrac{d\bar{w}}{dx}dx - \dfrac{x_1/L}{H_1}\int_{x_1}^L \dfrac{d\bar{w}}{dx}dx}{\dfrac{L}{EA} - \dfrac{q\int_0^L \dfrac{dy}{dx}(2x-L)dx}{2H_1^2} + \dfrac{\int_0^{x_1}\left(\dfrac{d\bar{w}}{dx}\right)^2 dx + \int_{x_1}^L \left(\dfrac{d\bar{w}}{dx}\right)^2 dx}{H_1} - \dfrac{\Delta Z\left(\int_0^{x_1}\dfrac{d\bar{w}}{dx}dx + \int_{x_1}^L \dfrac{d\bar{w}}{dx}dx\right)}{H_1 L}} \qquad (8)$$

-continued $$\frac{d(y_0 + \bar{v})}{dx} = \frac{q}{2H_1}(L - 2x) + \frac{\Delta Y}{L} \quad (9)$$

$$\frac{d\bar{w}}{dx} = \frac{1}{H_1 L}\int_0^L \int_0^{x_2}(\bar{f}_{Ref}(x_1)dx_1)dx_2 - \frac{1}{H_1}\int_0^x \bar{f}_{Ref}(x_1)dx_1 + \frac{\Delta Z}{L} \quad (10)$$

Meanings of parameters in the formulas: $y_0$, $\bar{v}$ and $\bar{w}$ respectively represent initial vertical displacement, vertical displacement under combined action of mean wind and support displacement, and lateral displacement caused by mean wind of the span conducting wire.

Finally, total lateral unbalanced force can be obtained:

$$\hat{T}_{z0}(t) = \bar{T}_{z0}(t) + T_{z0}(t) \quad (11)$$

$$\hat{T}_{z1}(t) = \bar{T}_{z1}(t) + T_{z1}(t) \quad (12)$$

Further, influence of large deformation effect of the span conducting wire on wind load is corrected by the present invention, and the steps thereof are as follows:
(a) Letting initial value of horizontal tension $H_{1i}$ be $H_0$, and i be a positive integer;
(b) Calculating mean wind pressure at each point of the conducting wire respectively, with the expression of the theoretical wind pressure function being:

$$\bar{f}_{Ref}(x) = \frac{1}{2}\rho C_D D V_{10}^2 \left(\frac{H_C}{10} - \frac{q(L-x)x}{20H_{1i}} - \frac{c_0 + \Delta Y}{10L}x\right)^{2\alpha} \quad (13)$$

Meanings of parameters in the formula: where: $\rho$ represents air density; $C_D$ represents drag coefficient; D represents diameter of the conducting wire; $V_{10}$ represents basic wind speed; $H_C$ represents ground clearance of a conducting wire support; and $\alpha$ represents wind profile exponent.
(c) Solving the horizontal tension $H_1$ by formula (1);
(d) If $|H_1 - H_{1i}| >$ tolerance error, letting i=i+1, $H_{1i}=H_1$, and repeating steps (b) and (c); and
(e) If $|H_1 - H_{1i}| <$ tolerance error, generating three-dimensional coordinates of the conducting wire, and outputting mean wind speed and fluctuating wind speed.

Further, trapezoidal equivalent wind pressure $\bar{f}_{Tra}$ used for improving calculation efficiency of the present invention is proposed, and the expression thereof is:

$$\bar{f}_{Tra} = k(x - L/2) + \bar{f}_{Uni} \quad (14)$$

$\bar{f}_{Uni}$ represents uniform wind pressure, and the expression thereof is:

$$\bar{f}_{Uni} = \frac{1}{L}\int_0^L \bar{f}_{Ref}(x)dx \quad (15)$$

k represents slope of the trapezoidal wind pressure, which takes the slope of a theoretical wind pressure function at a midspan point, and the expression thereof is:

$$k = \bar{f}'_{Ref}(L/2) = -\alpha\rho C_D D V_{10}^2 \left(\frac{H_C}{10} - \frac{qL^2}{80H_1} - \frac{c_0 + \Delta Y}{20}\right)^{2\alpha-1}\left(\frac{c_0 + \Delta y}{10L}\right) \quad (16)$$

The present invention has the following beneficial effects:
(1) The present invention can quantify unbalanced force caused by a failed tower to an adjacent tower, thus to quantitatively evaluate cascading failure risk of transmission lines. Compared with existing methods, the present invention does not need a lot of iteration, can parametrically reveal influence of various factors on unbalanced force, and has high novelty.

(2) Compared with existing methods, the present invention quantifies influence of large deformation effect of a conducting wire on wind load, and at the same time, wind load of the conducting wire is corrected by the trapezoidal equivalent wind pressure proposed, which avoids wind load calculation error of the conducting wire caused by a relatively large vertical height difference, better reflects actual mechanical state of the transmission lines, optimizes existing wind load calculation method of transmission lines, and has high creativity.

(3) The present invention has the advantages of simple implementation, high analysis efficiency and high analysis accuracy, and has a very good application prospect in transmission line design industry. The present invention is suitable for transmission line analysis in various conditions and has wide applicability.

DETAILED DESCRIPTION

To make the purpose, features and advantages of the present invention more clear and legible, the technical solution in the embodiments of the present invention will be clearly and fully described below in combination with the drawings in the embodiments of the present invention. Apparently, the described embodiments are merely part of the embodiments of the present invention, not all of the embodiments. Based on the embodiments in the present invention, all other embodiments obtained by those ordinary skilled in the art without contributing creative labor will belong to the protection scope of the present invention.

Figure 1:
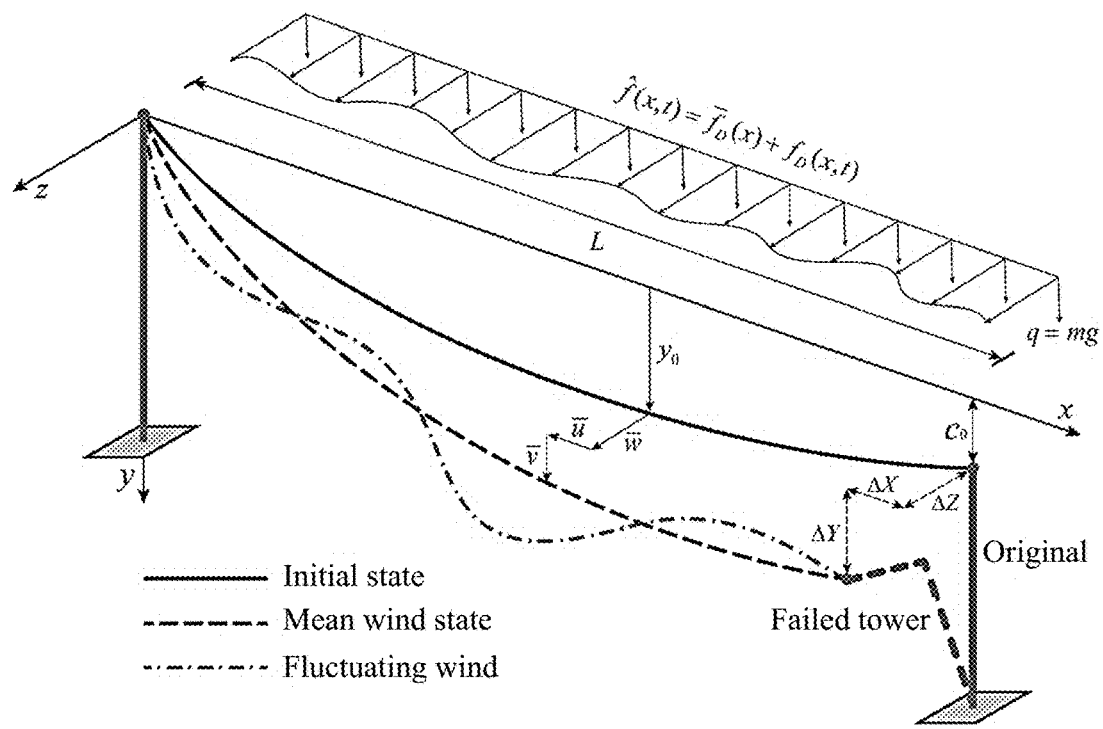
FIG. 1 is a schematic diagram showing calculation provided by an embodiment of the present invention.
Figure 2:
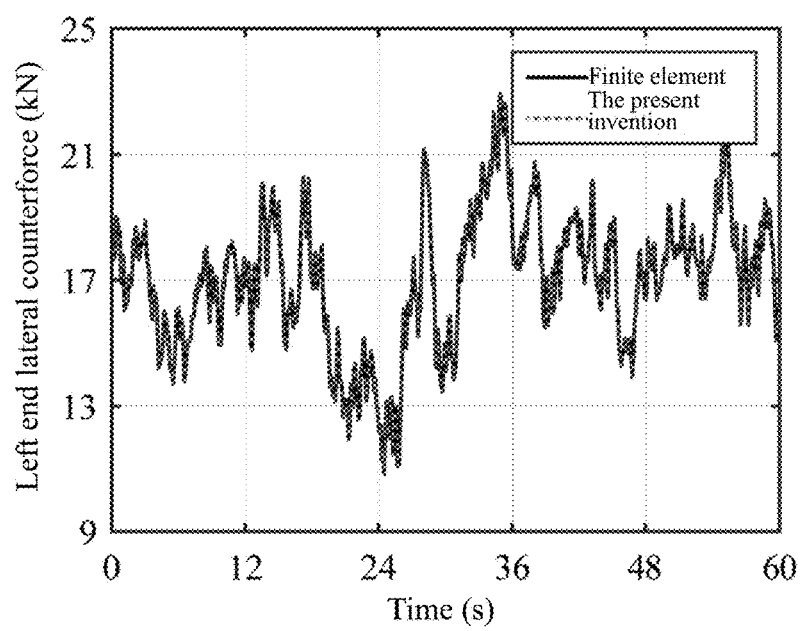
FIG. 2 is a time history diagram of quasi-static lateral unbalanced force at a left end support provided by an embodiment of the present invention.
Figure 3:
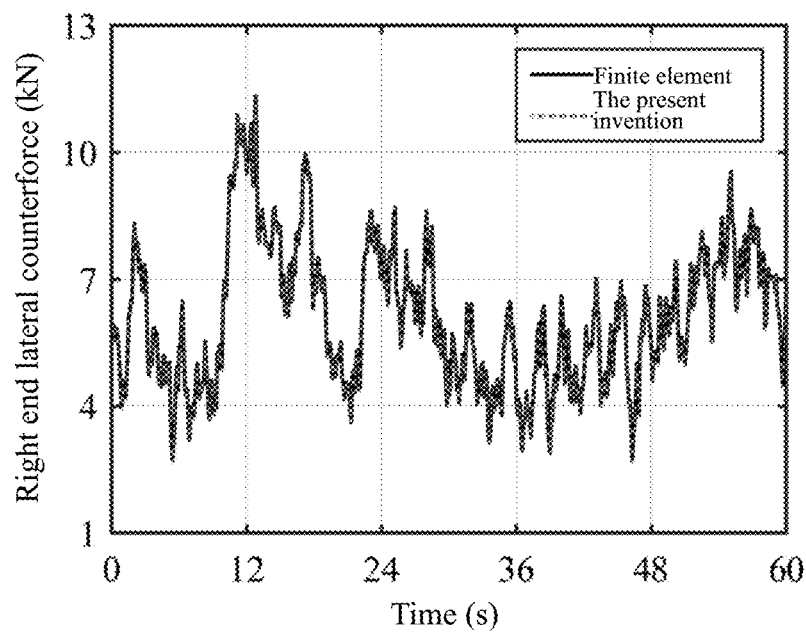
FIG. 3 is a time history diagram of quasi-static lateral unbalanced force at a right end support provided by an embodiment of the present invention.

As shown in FIG. 1 to FIG. 3, an embodiment of the present invention is further described below in combination with the technical solution.

Parameters of the conducting wire in the embodiment are as follows: landform is Class B landform in the Chinese specification "DL/T 5551-2018, 2018. Load code for the design of overhead transmission line. China Planning Press, Beijing"; the initial vertical height difference is 15 m; the Young's modulus is 6.5E10 Pa; the initial horizontal tension is 75000 N; the horizontal span is 800 m; cross-sectional area of the conducting wire is 666.55 mm$^2$; the weight per linear meter of the conducting wire is 2 kg/m; height at a left hang point of the conducting wire is 65 m; support displacements $\Delta X$, $\Delta Y$ and $\Delta Z$ are respectively 0.5 m, 35 m and 20 m, and the directions thereof are shown in FIG. 1. At the same time, in the embodiment, calculation results of the present invention are compared with those of the nonlinear finite element method; a software used is the general finite element analysis software ANSYS, number of conducting wire units is 100, initial configuration of the conducting wire is determined by a cyclic shape-finding method, form-finding accuracy is 1/500, and wind load is loaded on each node in the form of concentrated force. In the present invention, the lateral unbalanced force is determined according to the following steps:

Step 1: Determining Mean Wind-Induced Lateral Unbalanced Force

As shown in FIG. 1, the conducting wire in initial state is subjected only to self weight; when three-dimensional displacement of the right end support occurs, considering the combined action of mean wind load and support displacement, the conducting wire achieves mean wind state, and thus compatibility equations from the initial state to the mean wind state can be obtained, as shown in formulas (1) to (3). In which, mean wind is calculated using a method recommended in the Chinese specification "D/T 5551-2018, 2018. Load code for the design of overhead transmission line. China Planning Press, Beijing", and the wind profile exponent is 0.15. Substituting the above parameters into formulas (1) to (3), a standard cubic equation with $H_1$ as a variable is obtained:

$$H_1^3 + \left(\frac{EAq^2L^2}{24H_0^2} - \frac{EA(\Delta Y^2 + \Delta Z^2 + 2L\Delta X + 2c_0\Delta Y)}{2L^2} - H_0\right)H_1^2 + \tag{1}$$

$$\left(-\frac{EA\Delta Z\lambda}{L^3}\right)H_1 + EA\left(-\frac{q^2L^2}{24} - \frac{\delta}{2L^3}\right) = 0$$

$$\delta = \int_0^L \left(\left(\int_0^L \int_0^{x_2} (\bar{f}_{Ref}(x_1)dx_1)dx_2\right)^2 + L^2\left(\int_0^x \bar{f}_{Ref}(x_1)dx_1\right)^2 - \tag{2}$$

$$2L\int_0^L \int_0^{x_2} (\bar{f}_{Ref}(x_1)dx_1)dx_2 \cdot \int_0^x \bar{f}_{Ref}(x_1)dx_1\right)dx = 2.5 \times 10^{16}$$

$$\lambda = \int_0^L \left(\int_0^L \int_0^{x_2} (\bar{f}_{Ref}(x_1)dx_1)dx_2 - L\int_0^x \bar{f}_{Ref}(x_1)dx_1\right)dx = 3.73 \times 10^{-9} \tag{3}$$

Meanings of parameters in the formulas: $H_1$ represents horizontal tension of the conducting wire under combined action of support displacement and mean wind; $H_0$ represents initial horizontal tension; EA represents Young's modulus; q represents weight per unit length of the conducting wire; L represents horizontal span; both $\delta$ and $\lambda$ represent constants related to mean wind pressure; and $\bar{f}_{Ref}(x)$ is a theoretical wind pressure function. H1 represents horizontal tension of the span conducting wire under combined action of support displacement and mean wind.

Cardan's formula is used to solve formula (1), and the horizontal tension of the conducting wire in the mean wind state is 145320 N, which is about twice of the horizontal tension in the initial state. The mean wind-induced lateral unbalanced force at both ends of the span conducting wire is:

$$\bar{T}_{z0} = \frac{1}{L}\int_0^L \int_0^{x_2} (\bar{f}_{Ref}(x_1)dx_1)dx_2 + \frac{H_1\Delta Z}{L} = 17890N \tag{4}$$

$$\bar{T}_{z1} = \frac{1}{L}\int_0^L \int_0^{x_2} (\bar{f}_{Ref}(x_1)dx_1)dx_2 - \int_0^x \bar{f}_{Ref}(x_1)dx_1 + \frac{H_1\Delta Z}{L} = 6181N \tag{5}$$

Where: subscripts 0 and 1 respectively represent one side of the conducting wire without support displacement and one side of the conducting wire with support displacement, the same below. It can be known from FIG. 2 and FIG. 3 that the mean value of time history of the quasi-static lateral unbalanced force is the same as the calculation results of formulas (4) and (5).

Step 2: Determining Fluctuating Wind-Induced Lateral Unbalanced Force

Time history of the fluctuating wind speed is generated by a harmonic superposition method, wind spectrum adopts a Davenport wind spectrum, coherence function adopts a Shiotani frequency-independent three-dimensional coherence function, and the wind load is simplified as discrete random concentrated force according to quasi-steady theory. Considering quasi-static background response only, the fluctuating wind-induced lateral unbalanced force at both ends of the conducting wire is calculated by an influence line method:

$$T_{z0} = \frac{L}{n}\sum_{i=1}^n \left(1 - \frac{x_i}{L} + \frac{\Delta Z}{L}\varphi_h\right)F_{Ref}(x_i, t) \tag{6}$$

$$T_{z1}(t) = \frac{L}{n}\sum_{i=1}^n \left(\frac{x_i}{L} - \frac{\Delta Z}{L}\varphi_h\right)F_{Ref}(x_i, t) \tag{7}$$

Meanings of parameters in the formulas: $F_{Ref}(x_i,t)$ represents fluctuating wind load acting on each point of the conducting wire; n represents number of wind speed simulation points; $x_i$ represents x-coordinate of the fluctuating wind load; $\varphi_h$ represents increment of horizontal tension of the conducting wire caused by unit wind load, and the expression thereof is:

$$\varphi_h = \frac{\frac{1-x_1/L}{H_1}\int_0^{x_1}\frac{d\bar{w}}{dx}dx - \frac{x_1/L}{H_1}\int_{x_1}^L \frac{d\bar{w}}{dx}dx}{\frac{L}{EA} - \frac{q\int_0^L \frac{dy}{dx}(2x-L)dx}{2H_1^2} + \frac{\int_0^{x_1}\left(\frac{d\bar{w}}{dx}\right)^2 dx + \int_{x_1}^L \left(\frac{d\bar{w}}{dx}\right)^2 dx}{H_1} - } \tag{8}$$

$$\frac{\Delta Z\left(\int_0^{x_1}\frac{d\bar{w}}{dx}dx + \int_{x_1}^L \frac{d\bar{w}}{dx}dx\right)}{H_1 L}$$

$$\frac{d(y_0 + \bar{v})}{dx} = \frac{q}{2H_1}(L - 2x) + \frac{\Delta Y}{L} \tag{9}$$

$$\frac{d\bar{w}}{dx} = \frac{1}{H_1 L}\int_0^L \int_0^{x_2} (\bar{f}_{Ref}(x_1)dx_1)dx_2 - \frac{1}{H_1}\int_0^x \bar{f}_{Ref}(x_1)dx_1 + \frac{\Delta Z}{L} \tag{10}$$

Meanings of parameters in the formulas: $y_0$, $\bar{v}$ and $\bar{w}$ respectively represent initial vertical displacement, vertical displacement under combined action of mean wind and support displacement, and lateral displacement caused by mean wind of the conducting wire.

Finally, total lateral unbalanced force can be obtained:

$$\hat{T}_{z0}(t) = \bar{T}_{z0}(t) + T_{z0}(t) \tag{11}$$

$$\hat{T}_{z1}(t) = \bar{T}_{z1}(t) + T_{z1}(t) \tag{12}$$

60-second lateral dynamic counterforce is calculated by the above formulas, and the results are shown in FIG. 1 and FIG. 2. Comparison with the results of the nonlinear finite element method shows that the method provided by the present invention has relatively high accuracy.

Large deformation effect of the conducting wire has significant influence on the wind load. If the wind load in initial state is always used as input, significant distortion of response will be caused. The steps to eliminate the influence of the large deformation effect of the conducting wire are as follows:

(a) Letting initial value of horizontal tension $H_{1i}$ be $H_0$, and i be a positive integer;
(b) Calculating mean wind pressure at each point of the conducting wire respectively, with the expression of the theoretical wind pressure being:

$$\bar{f}_{Ref}(x) = \frac{1}{2}\rho C_D D V_{10}^2 \left(\frac{H_C}{10} - \frac{q(L-x)x}{20H_{1i}} - \frac{c_0 + \Delta Y}{10L}x\right)^{2\alpha} \tag{13}$$

Meanings of parameters in the formula: where: $\rho$ represents air density; $C_D$ represents drag coefficient; D represents diameter of the conducting wire; $V_{10}$ represents basic wind speed; $H_C$ represents ground clearance of a conducting wire support; and $\alpha$ represents wind profile exponent.

(c) Solving the horizontal tension $H_1$ by formula (1);
(d) If $|H_1-H_{1i}|$>tolerance error, letting i=i+1, $H_{1i}=H_1$, and repeating steps (b) and (c); and
(e) If $|H_1-H_{1i}|$<tolerance error, generating three-dimensional coordinates of the conducting wire, and outputting mean wind speed and fluctuating wind speed.

Calculation shows that: if the large deformation effect is not considered, values of mean lateral counterforce on the left and right sides are respectively 19380 N and 10460 N; if the large deformation effect is considered, values of mean lateral counterforce on the left and right sides are respectively 17890 N and 6181 N. Therefore, the lateral unbalanced force will be overestimated if the large deformation effect is not considered.

Figure 4:
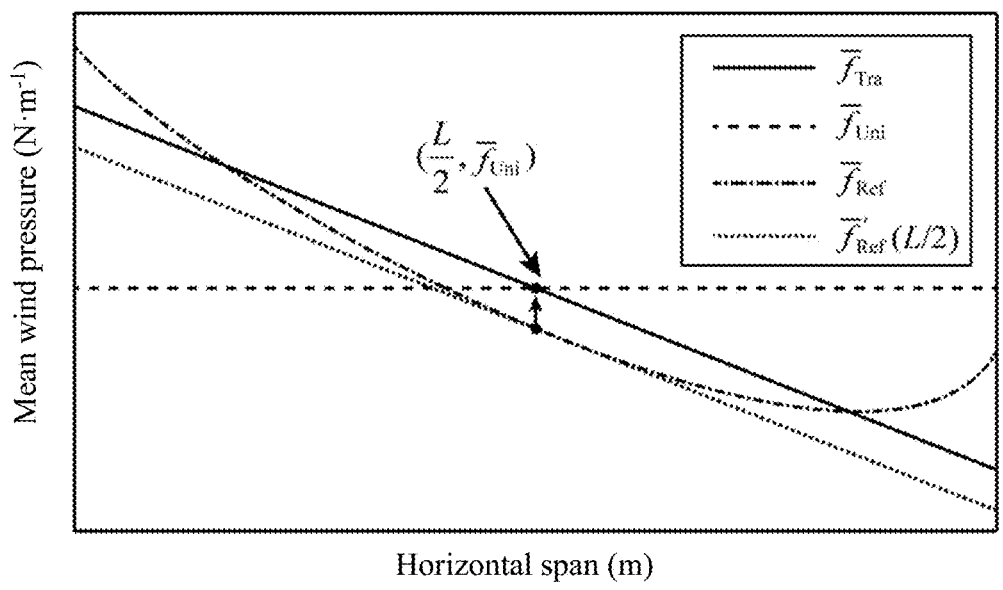
FIG. 4 is a schematic diagram of various wind pressure distributions provided by an embodiment of the present invention.

Further, FIG. 4 shows a schematic diagram of the trapezoidal equivalent wind pressure $\bar{f}_{Tra}$, the uniform wind pressure $\bar{f}_{Uni}$, the theoretical wind pressure $\bar{f}_{Ref}$ and slope $\bar{f}_{Ref}'(L/2)$ of the theoretical wind pressure at a midspan point.

The expression of the trapezoidal equivalent wind pressure $\bar{f}_{Tra}$ is:

$$\bar{f}_{Tra}=k(x-L/2)+\bar{f}_{Uni}=-0.0412\times(x-L/2)+29.96 \quad (14)$$

The value of the uniform wind pressure $f_{Uni}$ is:

$$\bar{f}_{Uni} = \frac{1}{L}\int_0^L \bar{f}_{Ref}(x)dx = 29.96 N/m \quad (15)$$

k represents the slope of the trapezoidal wind pressure, and the value is:

$$k = \bar{f}_{Ref}'(L/2) = \quad (16)$$

$$-\alpha\rho C_D DV_{10}^2\left(\frac{H_C}{10} - \frac{qL^2}{80H_1} - \frac{c_0+\Delta Y}{20}\right)^{2\alpha-1}\left(\frac{c_0+\Delta Y}{10L}\right) = -0.0412$$

Calculation shows that: if the theoretical wind pressure of formula (13) is used, values of mean lateral counterforce on the left and right sides are respectively 17890 N and 6181 N; if the uniform wind pressure of formula (15) is used, values of mean lateral counterforce on the left and right sides are respectively 17560 N and 8196 N; if the trapezoidal equivalent wind pressure provided by the present invention is used, values of mean lateral counterforce on the left and right sides are respectively 17980 N and 5991 N. Based on the theoretical wind pressure, the maximum error of the trapezoidal equivalent wind pressure is 3.07%, while the maximum error of the uniform wind pressure is 32.6%. Therefore, the trapezoidal wind pressure proposed in the present invention is a good approximation to the theoretical wind pressure.

The above embodiments are only used for describing the technical solution of the present invention rather than limiting the same. Although the present invention is described in detail by referring to the above embodiments, those ordinary skilled in the art should understand that the technical solution recorded in each of the above embodiments can be still amended, or some technical features therein can be replaced equivalently. However, these amendments or replacements do not enable the essence of the corresponding technical solutions to depart from the spirit and the scope of the technical solutions of various embodiments of the present invention.

The invention claimed is:

1. A quasi-static calculation method for lateral unbalanced force of transmission lines, comprising the following steps:

step 1: determining mean wind-induced lateral unbalanced force for a span conducting wire with an initial vertical height difference $c_0$ at both ends, displacement components of one end in longitudinal direction (x-axis direction), vertical direction (y-axis direction) and lateral direction (z-axis direction) are respectively $\Delta X$, $\Delta Y$ and $\Delta Z$, and a standard cubic equation with $H_1$ as a variable is obtained:

$$H_1^3 + \left(\frac{EAq^2L^2}{24H_0^2} - \frac{EA(\Delta Y^2+\Delta Z^2+2L\Delta X+2c_0\Delta Y)}{2L^2} - H_0\right)H_1^2 + \quad (1)$$

$$\left(-\frac{EA\Delta Z\lambda}{L^3}\right)H_1 + EA\left(-\frac{q^2L^2}{24} - \frac{\delta}{2L^3}\right) = 0$$

$$\delta = \int_0^L\left(\left(\int_0^L\int_0^{x_2}(\bar{f}_{Ref}(x_1)dx_1)dx_2\right)^2 + L^2\left(\int_0^x \bar{f}_{Ref}(x_1)dx_1\right)^2 - \quad (2)$$

$$2L\int_0^L\int_0^{x_2}(\bar{f}_{Ref}(x_1)dx_1)dx_2 \cdot \int_0^x \bar{f}_{Ref}(x_1)dx_1\right)dx$$

$$\lambda = \int_0^L\left(\int_0^L\int_0^{x_2}(\bar{f}_{Ref}(x_1)dx_1)dx_2 - L\int_0^x \bar{f}_{Ref}(x_1)dx_1\right)dx \quad (3)$$

where: $H_0$ represents initial horizontal tension; EA represents Young's modulus; q represents weight per unit length of the span conducting wire; L represents horizontal span; both $\delta$ and $\lambda$ represent constants related to mean wind pressure; $\bar{f}_{Ref}(x)$ is a distribution function of the mean wind pressure along line direction; and $H_1$ represents horizontal tension of the span conducting wire under combined action of support displacement and mean wind, which can be obtained by solving formula (1) via a Cardan's formula;

further, the mean wind-induced lateral unbalanced force at both ends of the span conducting wire is obtained:

$$T_{z0} = \frac{1}{L}\int_0^L\int_0^{x_2}(\bar{f}_{Ref}(x_1)dx_1)dx_2 + \frac{H_1\Delta Z}{L} \quad (4)$$

$$T_{z1} = \frac{1}{L}\int_0^L\int_0^{x_2}(\bar{f}_{Ref}(x_1)dx_1)dx_2 - \int_0^x \bar{f}_{Ref}(x_1)dx_1 + \frac{H_1\Delta Z}{L} \quad (5)$$

where: subscripts 0 and 1 respectively represent one side of the span conducting wire without support displacement and one side of the span conducting wire with support displacement, the same below;

step 2: determining fluctuating wind-induced lateral unbalanced force considering quasi-static background response only, the fluctuating wind-induced lateral unbalanced force at both ends of the span conducting wire is calculated by an influence line method:

$$T_{z0}(t) = \frac{L}{n}\sum_{i=1}^n\left(1 - \frac{x_i}{L} + \frac{\Delta Z}{L}\varphi_h\right)F_{Ref}(x_i,t) \quad (6)$$

$$T_{z1}(t) = \frac{L}{n}\sum_{i=1}^n\left(\frac{x_i}{L} - \frac{\Delta Z}{L}\varphi_h\right)_{z1i} F_{Ref}(x_i,t) \quad (7)$$

where: $F_{Ref}(x_i,t)$ represents fluctuating wind load acting on each point of the span conducting wire; n represents number of wind speed simulation points; $x_i$ represents x-coordinate of the fluctuating wind load; $\varphi_h$ represents increment of horizontal tension caused by unit wind load, and the expression thereof is:

$$\varphi_h = \frac{\frac{1-x_1/L}{H_1}\int_0^{x_1}\frac{d\overline{w}}{dx}dx - \frac{x_1/L}{H_1}\int_{x_1}^L\frac{d\overline{w}}{dx}dx}{\frac{L}{EA} - \frac{q\int_0^L\frac{d(y_0+\overline{v})}{dx}(2x-L)dx}{2H_1^2} + \frac{\int_0^{x_1}\left(\frac{d\overline{w}}{dx}\right)^2 dx + \int_{x_1}^L\left(\frac{d\overline{w}}{dx}\right)^2 dx}{H_1}} - \frac{\Delta Z\left(\int_0^{x_1}\frac{d\overline{w}}{dx}dx + \int_{x_1}^L\frac{d\overline{w}}{dx}dx\right)}{H_1 L}$$ (8)

$$\frac{d(y_0+\overline{v})}{dx} = \frac{q}{2H_1}(L-2x) + \frac{\Delta y}{L}$$ (9)

$$\frac{d\overline{w}}{dx} = \frac{1}{H_1 L}\int_0^L\int_0^{x_2}\left(\bar{f}_{Ref}(x_1)\lambda 1 x_1\right)dx_2 - \frac{1}{H_1}\int_0^x \bar{f}_{Ref}(x_1)\lambda 1 x_1 + \frac{\Delta Z}{L}$$ (10)

where: $y_0$, $\overline{v}$ and $\overline{w}$ respectively represent initial vertical displacement, vertical displacement under combined action of mean wind and support displacement, and lateral displacement caused by mean wind of the span conducting wire;

finally, total lateral reaction force is a sum of the mean wind-induced lateral unbalanced force and the fluctuating wind-induced lateral unbalanced force, the total lateral unbalanced force is obtained:

$$\hat{T}_{z0}(t) = \overline{T}_{z0} + T_{z0}(t)$$ (11)

$$\hat{T}_{z1}(t) = \overline{T}_{z1} + T_{z1}(t)$$ (12).

2. The quasi-static calculation method for lateral unbalanced force of transmission lines according to claim 1, wherein influence of large deformation effect of the span conducting wire on the mean wind pressure $\bar{f}_{Ref}(x)$ need to be corrected, and the steps are as follows:

(a) $H_{1i}$ is the corrected horizontal tension of a span conducting wire, and it is an intermediate variable for calculating mean wind pressure; letting initial value of the $H_{1i}$ be $H_0$, and i be a positive integer;

(b) calculating mean wind pressure at each point of the span conducting wire respectively, with the expression thereof being:

$$\bar{f}_{Ref}(x) = \frac{1}{2}\rho C_D D V_{10}^2\left(\frac{H_C}{10} - \frac{q(L-x)x}{20H_{1i}} - \frac{c_0+\Delta Y}{10L}x\right)^{2\alpha}$$ (13)

where: $\rho$ represents air density; $C_D$ represents drag coefficient; D represents diameter of the span conducting wire; $V_{10}$ represents wind speed; $H_C$ represents ground clearance of a conducting wire support; and $\alpha$ represents wind profile exponent;

(c) solving the horizontal tension $H_1$ by formula (1);

(d) if $|H_1 - H_{1i}| >$ tolerance error, letting i=i+1, $H_{1i} = H_1$, and repeating steps (b) and (c); and (e) if $|H_1 - H_{1i}| <$ tolerance error, outputting the corrected mean wind pressure $\bar{f}_{Ref}(x)$ of the span conducting wire.

* * * * *